(12) United States Patent
Guertin et al.

(10) Patent No.: US 11,951,768 B2
(45) Date of Patent: Apr. 9, 2024

(54) HUB FOR RETAINING SPOKES WITH LOOPS

(71) Applicant: Berd L.L.C., Hopkins, MN (US)

(72) Inventors: Bradley Leo Guertin, Roseville, MN (US); Charles Steven Spanjers, St. Louis Park, MN (US); Allison Lynne Horner, Minneapolis, MN (US)

(73) Assignee: BERD L.L.C., Hopkins, MN (US)

( * ) Notice: Subject to any disclaimer, the term of this patent is extended or adjusted under 35 U.S.C. 154(b) by 234 days.

(21) Appl. No.: 17/468,233

(22) Filed: Sep. 7, 2021

(65) Prior Publication Data
US 2022/0072898 A1 Mar. 10, 2022

Related U.S. Application Data

(60) Provisional application No. 63/075,152, filed on Sep. 6, 2020.

(51) Int. Cl.
B60B 1/04 (2006.01)
B60B 1/14 (2006.01)
B60B 27/02 (2006.01)

(52) U.S. Cl.
CPC .............. B60B 1/042 (2013.01); B60B 1/14 (2013.01); B60B 27/023 (2013.01)

(58) Field of Classification Search
CPC ......... B60B 1/042; B60B 1/14; B60B 27/023; B60B 5/02
See application file for complete search history.

(56) References Cited

U.S. PATENT DOCUMENTS

| 151,360 | A | * | 5/1874 | Davis | B60B 1/042 301/57 |
| 430,687 | A | * | 6/1890 | Reinhold | B60B 1/042 301/59 |
| 582,486 | A | * | 5/1897 | Rowe | B60B 1/042 301/58 |
| 1,043,283 | A | * | 11/1912 | Zarth | B60B 21/064 301/56 |
| 3,871,710 | A |   | 3/1975 | Dian et al. | |

(Continued)

FOREIGN PATENT DOCUMENTS

CA 2202931 A1 10/1998
DE 4036340 A1 5/1992

(Continued)

OTHER PUBLICATIONS

International Search Report and Written Opinion in corresponding International Application No. PCT/US2021/049267 dated Jan. 5, 2022.

*Primary Examiner* — Kip T Kotter
(74) *Attorney, Agent, or Firm* — Steven M. Koehler; Westman, Champlin & Koehler, P.A.

(57) ABSTRACT

A hub and spoke assembly includes a hub body having a first end and a second end. Projections are on each end. The projections are spaced apart from each adjacent projection about a rotational axis of the hub. Each projection comprises a base portion joined to the hub body and a support extending from the base portion to a free end. A plurality of spokes is provided. Each spoke comprises an elongated braided fiber having a loop at a first end and a second end configured for attachment to a rim. At least one spoke is joined to each support of each projection.

24 Claims, 7 Drawing Sheets

(56) References Cited

U.S. PATENT DOCUMENTS

| | | |
|---|---|---|
| 4,729,605 A | 3/1988 | Imao et al. |
| 5,110,190 A | 5/1992 | Johnson |
| 5,131,727 A | 7/1992 | Johnson |
| 5,424,021 A | 6/1995 | Nakade et al. |
| 5,553,950 A | 9/1996 | Pawsat et al. |
| 6,036,281 A | 3/2000 | Campbell |
| 6,238,008 B1 * | 5/2001 | Forsythe ............... B60B 1/0223 301/59 |
| 6,354,699 B1 | 3/2002 | Tabe |
| 6,431,658 B1 | 8/2002 | Nakajima et al. |
| 6,511,133 B1 | 1/2003 | Tabe |
| 6,520,595 B1 | 2/2003 | Schlanger |
| 7,413,262 B2 | 8/2008 | Ording et al. |
| 7,562,940 B2 | 7/2009 | D'Aluisio |
| 7,673,946 B1 | 3/2010 | Hed |
| 7,874,625 B2 | 1/2011 | Addink |
| 7,988,240 B2 | 8/2011 | Lubecki |
| 8,313,154 B2 | 11/2012 | Lubecki |
| 8,794,714 B2 | 8/2014 | Lubecki |
| 9,315,071 B2 | 4/2016 | Webber |
| 9,662,931 B2 | 5/2017 | Schlanger |
| 9,944,349 B2 | 4/2018 | Biderman et al. |
| 10,150,332 B2 | 12/2018 | Spanjers et al. |
| 10,308,065 B2 | 6/2019 | Biderman et al. |
| 10,493,796 B2 | 12/2019 | Schlanger |
| 2001/0054840 A1 | 12/2001 | Schlanger |
| 2003/0085610 A1 | 5/2003 | Addink et al. |
| 2004/0155518 A1 | 8/2004 | Schlanger |
| 2005/0067881 A1 | 3/2005 | Schlanger |
| 2006/0197370 A1 | 9/2006 | Mercat et al. |
| 2007/0035176 A1 | 2/2007 | Lin |
| 2007/0138860 A1 | 6/2007 | Cappellotto et al. |
| 2008/0116738 A1 | 5/2008 | Urbani et al. |
| 2008/0265659 A1 | 10/2008 | Heyse |
| 2009/0066152 A1 * | 3/2009 | You ........................ B60B 27/04 301/106 |
| 2010/0078987 A1 | 4/2010 | Lubecki |
| 2011/0101768 A1 | 5/2011 | Schlanger |
| 2011/0241412 A1 | 10/2011 | Lubecki |
| 2013/0033094 A1 | 2/2013 | Lubecki |
| 2015/0035347 A1 | 2/2015 | Connolly |
| 2018/0029409 A1 | 2/2018 | Corrigan |
| 2019/0143744 A1 * | 5/2019 | Spanjers ................... B60B 5/02 301/58 |
| 2021/0039428 A1 | 2/2021 | Connolly |

FOREIGN PATENT DOCUMENTS

| | | | |
|---|---|---|---|
| EP | 1044827 A1 * | 10/2000 | ............ B60B 1/003 |
| EP | 1304238 A1 | 4/2003 | |
| EP | 1923232 A1 | 5/2008 | |
| GB | 2329616 A * | 3/1999 | ........... B60B 27/023 |
| GB | 2329618 A * | 3/1999 | ........... B60B 27/023 |
| WO | 2000035683 A1 | 6/2000 | |
| WO | 2004054819 A1 | 7/2004 | |
| WO | 2018125192 A1 | 7/2018 | |

* cited by examiner

HUB FOR RETAINING SPOKES WITH LOOPS

CROSS-REFERENCE TO RELATED APPLICATION

This application claims the benefit of U.S. Provisional Patent Application Ser. No. 63/075,152 entitled "Hub for Attaching Spokes with Loops" filed Sep. 6, 2020, the contents of which are incorporated herein by reference in its entirety.

BACKGROUND

The discussion below is merely provided for general background information and is not intended to be used as an aid in determining the scope of the claimed subject matter.

Wheels are frequently constructed using a central hub, an exterior rim, and a plethora of spokes to connect the hub to the rim. Spoked wheels are commonly used in bicycle applications because they offer high strength and low weight, both of which are important to competitive and leisure cyclists. Wheels that are particularly light weight are desirable because they reduce the rotational inertia of the wheel, thereby allowing the cyclist to climb hills more quickly or accelerate faster than would otherwise be possible.

To address the issue of weight with respect to the spokes in a wheel, U.S. Pat. No. 10,150,332 describes extremely lightweight braided fiber spokes. An additional benefit of braided fiber spokes is reduced vibration transmission from the cycling surface to the rider when compared to traditional metal spokes. These spokes contain a loop or eye splice formed on one end of the spoke which is produced by feeding the braided fiber back through itself. Methods by which these looped spokes can be made to interface with traditional bicycle rims and hubs are also provided.

Traditional hubs can be used with the braided fiber spokes described above, although an additional object, such as a non-integral rod, must be used to retain the spoke in the hub, or the spoke must be manipulated around itself in such a way as to risk damaging the spoke during installation. Further, traditional hubs contain sharp edges that can damage braided fiber spoke loops. Additionally, the process for building wheels with traditional hubs and spokes with loops is time-consuming and requires specialty tools. Therefore, traditional bicycle hubs do not provide an ideal interface for braided fiber spokes with loops. Because looped spokes are a relatively new invention, no previous hubs have been conceived specifically for the purpose of, and therefore are unable to adequately perform the function of, retaining the looped ends of spokes during installation and operation of the bicycle wheel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A first aspect of the invention is a hub and spoke assembly that includes a hub body that is symmetric about a rotational axis having a first end and a second end. A first plurality of projections is disposed on the hub body at the first end and a second plurality of projections disposed on the hub body at the second end. The projections of each of the first plurality projections and the second plurality projections are spaced apart from each adjacent projection about the rotational axis on the first and second ends, respectively. Each projection of the first plurality of projections and the second plurality of projections comprises a base portion joined to the hub body and a support extending from the base portion to a free end. A first plurality of spokes and a second plurality of spokes are provided. Each spoke of the first plurality of spokes and the second plurality of spokes comprises an elongated braided fiber having a loop at a first end and a second end configured for attachment to a rim. At least one spoke of the first plurality of spokes is joined to each support of the first plurality of projections with the loop disposed about the support, and at least one spoke of the second plurality of spokes is joined to each support of the second plurality of projections with the loop disposed about the support.

In some embodiments, each support of each projection of the first plurality of projections and the second plurality of projections extends from the base portion to the free end in a direction about the rotational axis, while in a further preferred embodiment the supports in each of the first plurality of projections and the second plurality of projections extend in opposite directions about the rotational axis. In such an embodiment, a single base portion may be used with supports extending in opposite directions. This configuration balances the load upon the base portion.

In some embodiments, each base portion of each projection of the first plurality of projections and the second plurality of projections extends radially away from a surface of the hub body with respect to the rotational axis, while in other embodiments, each base portion and associated support of each projection of the first plurality of projections and the second plurality of projections are disposed longitudinally inwardly from a perimeter edge of the first end and a perimeter edge of the second end, respectively. Although the projections can be separate pieces that are secured to the hub body, in a preferred embodiment, each base portion and associated support of each projection of the first plurality of projections and the second plurality of projections are integral with the hub body being formed from a single unitary body.

In some embodiments, the supports in each of the first plurality of projections and the second plurality of projections are curved so that portions of the support from the base portion to the free end are at a fixed radial distance from the rotational axis, which can make the hub more compact; however, in other embodiments, the supports in each of the first plurality of projections and the second plurality of projections are shaped so that portions of the support from the base portion to the free end are at different radial distances from the rotational axis. When the free end of each support is at a greater radial distance than the associated base portion, assembly of the spokes on the hub may be easier.

If desired, each of the first end and second end can comprise a flange with a flange body extending radially away from the hub body to an outer perimeter edge, and wherein the first plurality of projections are located on the flange of the first end and the second plurality of projections are located on the flange of the second end. Preferably in such an embodiment, each base portion and associated support of each projection of the first plurality of projections and the second plurality of projections are integral with the flange body being formed from a single unitary body.

In some embodiments, the outer perimeter edge of each of the first end and the second end is continuous about the rotational axis at a radial distance from the rotational axis greater than each of the associated base portions. Each support of each projection can extend away from the associated flange body in a direction parallel to the rotational axis, preferably where adjacent supports in each of the first plurality of projections and the second plurality of projections extend in opposite longitudinal directions with respect to the rotational axis. In other embodiments, the outer perimeter edge of each of the first end and the second end is discontinuous about the rotational axis wherein a radial slot is disposed between adjacent projections about the rotational axis in the flange body on each of the first and second ends.

In yet another embodiment, each support of each projection is egg or tear-drop shaped with the widest portion of the support being furthest from the rim such that it supports the loop of each spoke. This configuration spreads the tension load of the spoke over a longer portion of the loop since this longer portion is being supported by the widest portion of the support.

Another aspect of the invention is a hub comprising a hub body being symmetric about a rotational axis having a first end and a second end. Each of the first and second ends comprises a pair of longitudinally spaced apart flanges. Each flange has a flange body extending radially away from the hub body to an outer perimeter edge encircling the rotational axis, wherein each flange body includes apertures, and wherein the apertures of each flange are disposed about the rotational axis. A plurality of supports is provided. Each support is removably mounted in a pair of apertures in the flanges on each of the first and second ends.

In one embodiment, each support is mounted in each corresponding pair of apertures extends in a direction parallel to the rotational axis. A plurality of spokes is joined to the hub. Each spoke includes an elongated braided fiber having a loop at a first end and a second end configured for attachment to a rim. At least one spoke is joined to each support and the loop is disposed about the support with the support being mounted in the associated apertures; however in a preferred embodiment, two spokes are joined to each support.

Another aspect of the invention is a hub comprising a hub body being symmetric about a rotational axis having a first end and a second end. A first plurality of projections is disposed on the hub body at the first end and a second plurality of projections is disposed on the hub body at the second end. Each projection is spaced apart from each adjacent projection about the rotational axis on the first and second ends, respectively. Each projection comprises a base portion joined to the hub body and a support extending from the base portion to a free end. Each support of each projection of the first plurality of projections and the second plurality of projections extends from the base portion to the free end in a direction about the rotational axis.

In one embodiment, the supports in each of the first plurality of projections and the second plurality of projections extend in opposite directions about the rotational axis, and preferably adjacent supports in each of the first plurality of projections and the second plurality of projections extend in opposite directions about the rotational axis. Each base portion of each projection of the first plurality of projections and the second plurality of projections can be configured to extend radially away from a surface of the hub body with respect to the rotational axis.

DETAILED DESCRIPTION

Figure 1:
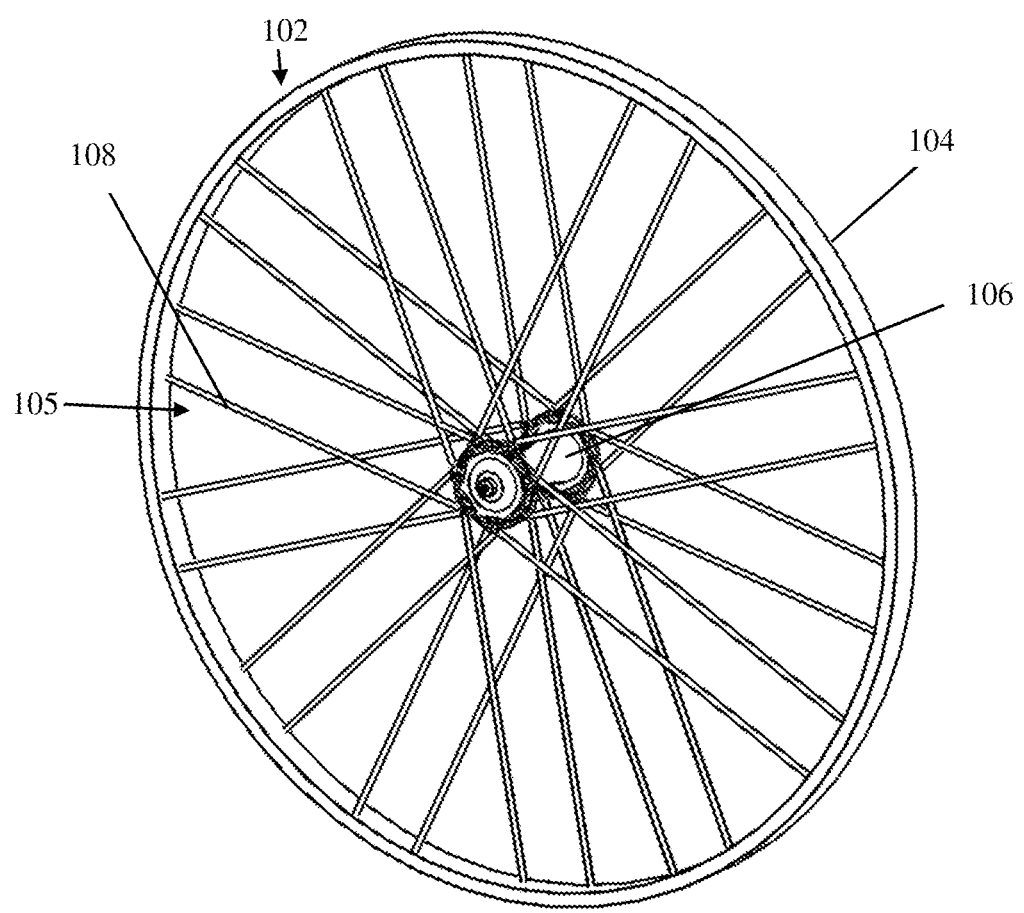
FIG. 1 is a perspective view of a wheel with a hub, braided fiber spokes with loops, and a rim.

Referring to FIGS. 1-4, a first embodiment of a hub and spoke assembly 105 is illustrated whereby spokes 108 connect a hub 106 to a rim 104 to make a complete wheel 102. Generally, the hubs and spoke assemblies described herein are particularly well-suited for human-powered bicycle wheels due to the low weight and durability. However, other applications can benefit from these embodiments such as but not limited to wheelchairs, automobiles, electric bicycles, and other motor vehicles.

The hub 106 includes a hub body 202 which is symmetric about a rotational axis 212 having a first end 207 and a second end 209. Projections 204 on the first end 207 and projections 206 on the second end 209 are spaced apart from each adjacent projection about the rotational axis 212. By being spaced apart, the projections 204,206 allow for a laterally stiff wheel 102 when the wheel 102 is subject to sideways load. Each projection in projections 204, 206 comprises a base portion 208 and a support 210.

As used herein the "base portion" is the portion of the projection joined to the hub body (which may include end flanges in embodiments described below), while the "support" functionally is that portion of the projection joined to the base portion that is in contact with a loop of a spoke. The support has a length longer than a width of the loop of the spoke. Each support extends from the base portion to a free end (e.g. 218).

Spokes 108 preferably comprise braided fibers with a loop 302 on a first end. Braided fiber spokes are disclosed in U.S. Pat. No. 10,150,332, which is hereby incorporated by reference in its entirety. The loop 302 is disposed about the support 210 of the projection 204, while a second end is attached to the rim 104, for example as described in U.S. Pat. No. 10,150,332.

Figure 3:
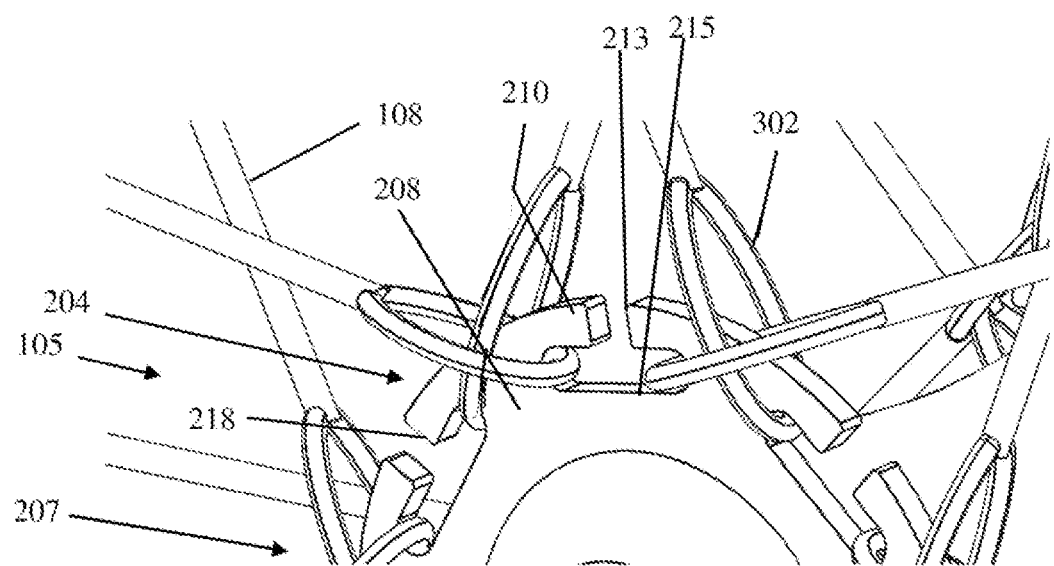
FIG. 3 is a perspective view of a portion the hub of FIG. 1 with projections and spokes with loops.
Figure 4:
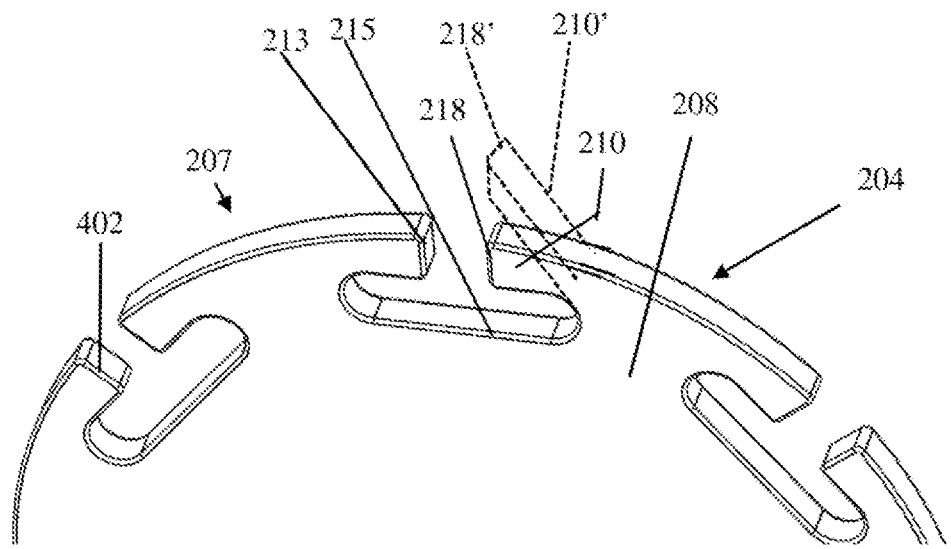
FIG. 4 is a perspective view of a portion of a second embodiment of a hub with projections.

In this embodiment, each projection comprises two supports 210 with associated free ends 218. An outer perimeter edge 211 is discontinuous about the rotational axis wherein a radial slot 213 is disposed between adjacent free ends 218. FIGS. 3 and 4 also illustrate an undercut slot 215 beneath the free ends 218. An undercut slot 215 may be desirable to better retain spokes with loops when no tensile load is applied to the spokes.

The projections 204,206 in this embodiment are ideally suited for braided fiber spokes 108 with loops 302 because two loops 302 of two separate spokes 108 can be connected to the same projection 204,206. In a preferred case, the spokes 108 may pull roughly opposite of each other to balance the tension load and reduce the stress on the base portion 208. The base portion 208 is designed such that it can withstand the forces (in both static and fatigue) involved with a wheel under load, whether that be derived from a drive or brake mechanism, or the weight of an object supported by a wheel.

Figure 2:
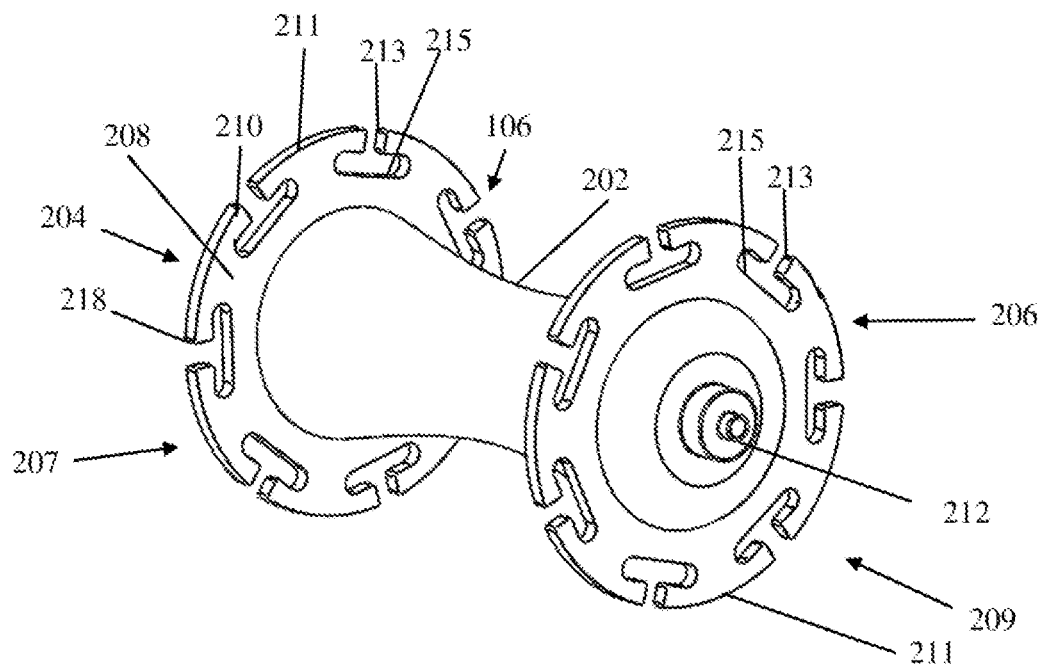
FIG. 2 is a perspective view of a hub with projections that retain spokes with loops.

Referring back to FIG. 2, multiple projections 204 and 206 are ideally spaced apart from each adjacent projection at the first and second ends 207,209 of the hub body 202, respectively, to provide many distributed locations for spokes 108 to connect to. In the embodiment depicted in FIGS. 2-3, a total of 14 projections provide attachment locations for 28 spokes, whereby two spokes 108 are connected to each projection 204,206; however in other embodiments more or less projections may be used. Alternatively, each projection 204,206 could attach just one spoke 108 such that the number of projections 204,206 and the number of spokes 108 are equal. It should be noted, the projections 204,206 need not be equally spaced around the hub body 202 as illustrated in FIGS. 1-3 nor do the attachment points in the rim 104 need to be distributed equally around the rotational axis of the rim.

Figure 5:
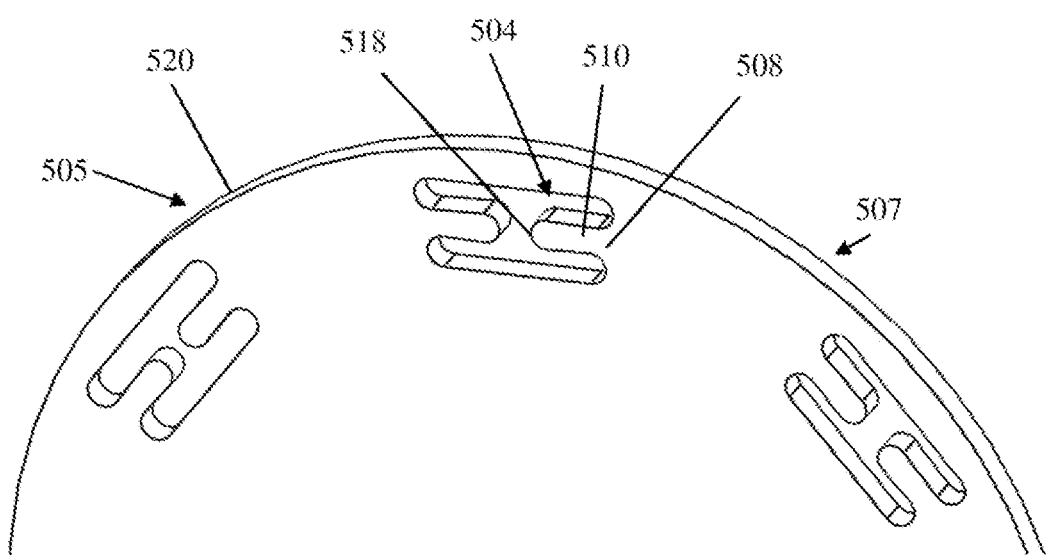
FIG. 5 is a perspective view of a portion of a third embodiment of a hub with projections.

FIGS. 5-11 illustrate various other embodiments of hub and spoke assemblies each having a projection comprising a base portion and at least one support with a free end. FIG. 5. illustrates an embodiment a hub and spoke assembly 505 where again one end 507 of a hub, not shown, is illustrated. The hub is generally of the same form as hub 106 having two ends and a center hub body. A second end would be similar to end 507. Projections 504 are joined to the end 507 where each projection 504 includes a base portion 508, a support 510 and free end 518. An outer perimeter edge 520 is continuous about the rotational axis. Rounded edges 402 on the projections 204 are ideally suited to prevent braided fibers from becoming cut or abraded when subject to tensile loads. While not specifically shown in other embodiments, similar rounded edges on bearing surfaces may be present to promote long-term durability of the braided fiber loops which contact those surfaces.

Figure 6:
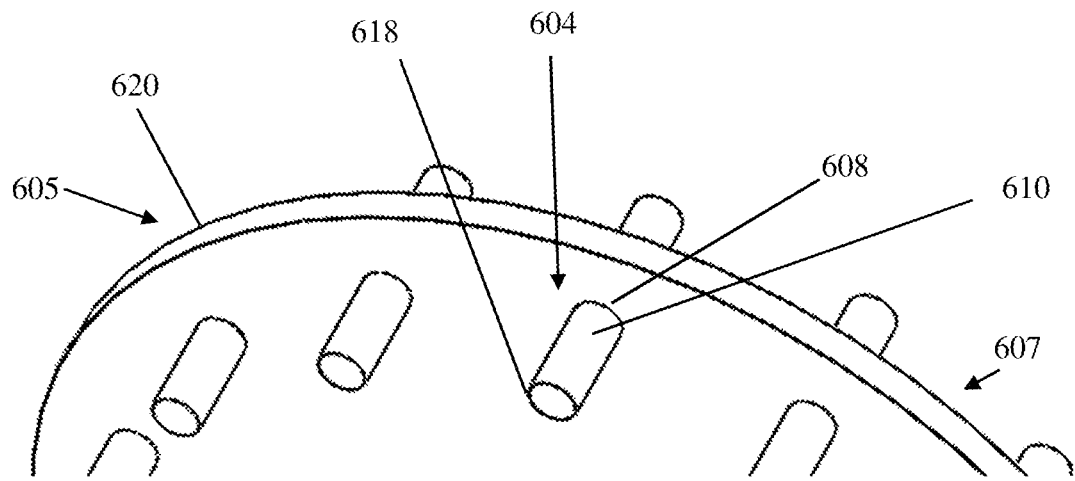
FIG. 6 is a perspective view of a portion of a fourth embodiment of a hub with projections.

FIG. 6 illustrates a hub and spoke assembly 605 having one end 607 of a hub, not shown, but generally of the same form as hub 106 having two ends and a center hub body. A second end would be similar to end 607. Projections 604 are joined to the end 607, preferably on opposite sides as shown. Each projection 604 includes a base portion 608, a support 610 and free end 618. An outer perimeter edge 620 is continuous about the rotational axis.

Figure 7:
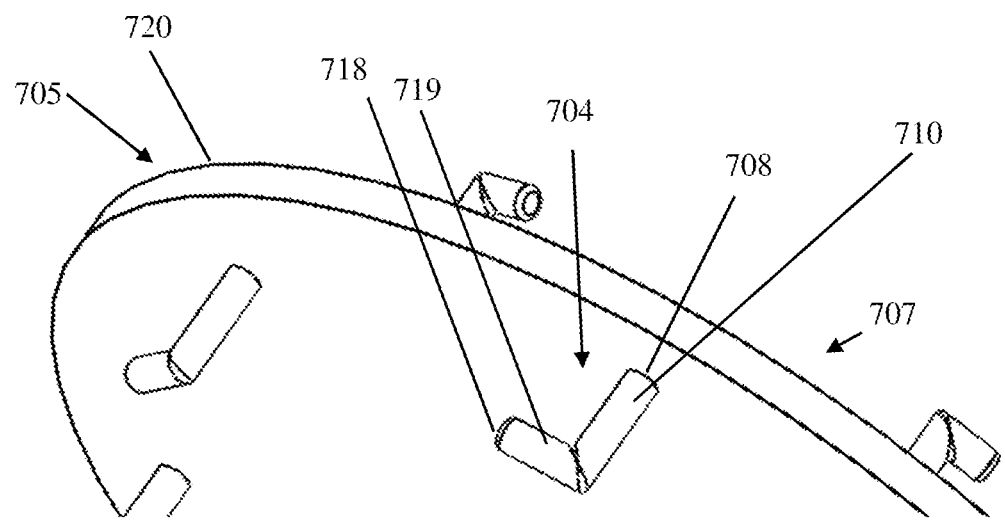
FIG. 7 is a perspective view of a portion of a fifth embodiment of a hub with projections.

FIG. 7 illustrates another embodiment of a hub and spoke assembly 705 similar to the embodiment of FIG. 6. One end 707 of a hub, not shown, is provided. Generally the hub is of the same form as hub 106 in that a second end would be similar to end 707 with a hub body provided between the ends. Projections 704 are joined to the end 707, preferably on opposite sides as shown. Each projection 704 includes a base portion 708, a support 710 and free end 718. Each support 710 further includes an end portion 719. End portions 719 are not axially aligned with each associated portion of the support 710 used to receive the loops, such portion extending directly from the base portion 708. The end portion 719 can help retain the loops on the projection 704 since the loops cannot be placed adjacent the free ends 718, where such is possible in the embodiment of FIG. 6. An outer perimeter edge 720 is continuous about the rotational axis.

Figure 8:
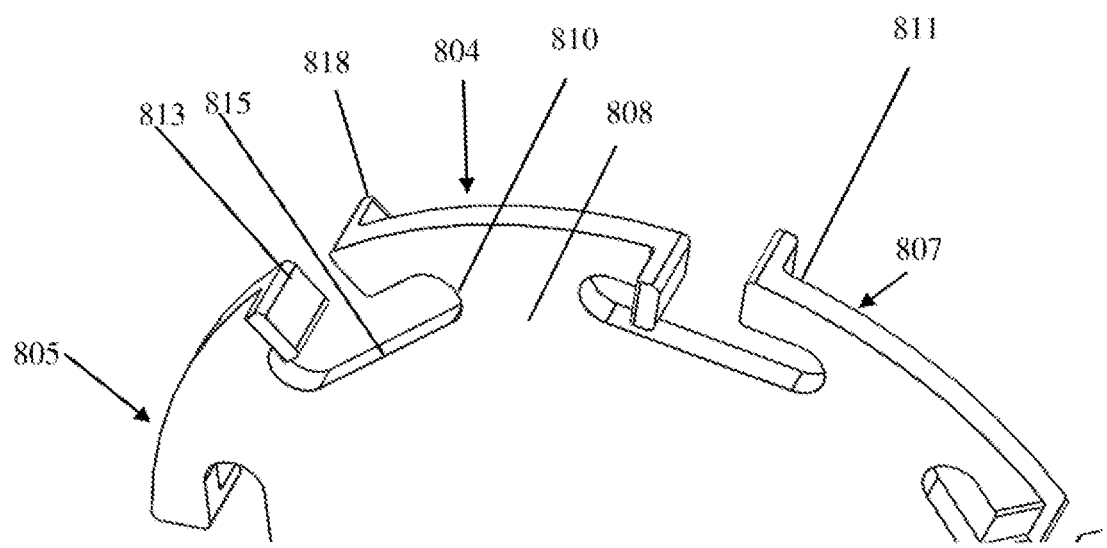
FIG. 8 is a perspective view of a portion of a sixth embodiment of a hub with projections.

FIG. 8 illustrates a hub and spoke assembly 805 having one end 807 of a hub, not shown, but generally of the same form as hub 106 having two ends and a center hub body. A second end would be similar to end 807. Projections 804 are joined to the end 807, preferably on opposite sides as shown. Each projection 804 includes a base portion 808, a support 810 and free end 818. Like the embodiment of FIGS. 2-4, an outer perimeter edge 811 is discontinuous about the rotational axis wherein a radial slot 813 is disposed between adjacent free ends 818. FIG. 8 also illustrates an undercut slot 815 beneath the free ends 818.

Figure 9:
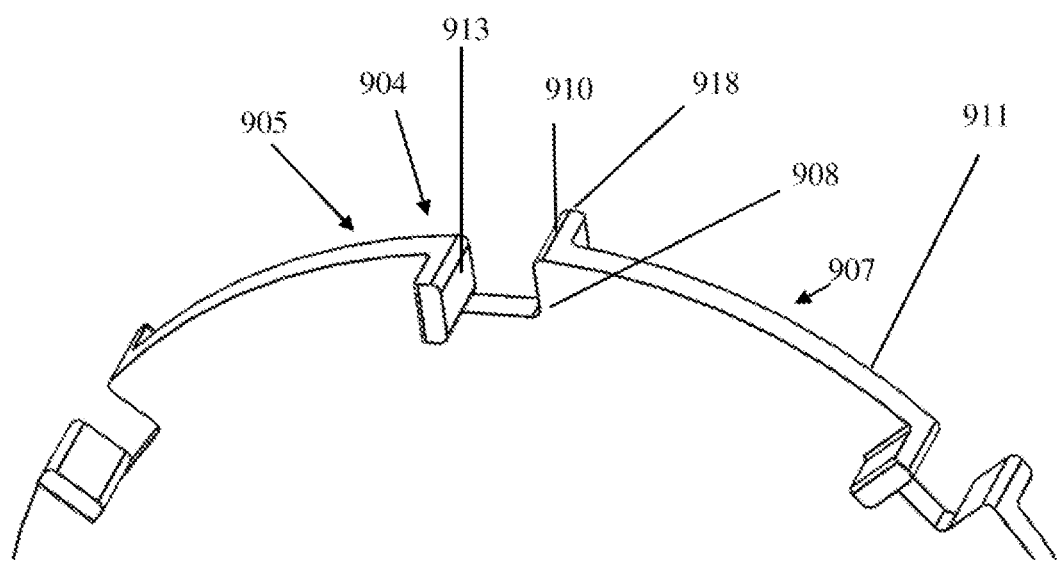
FIG. 9 is a perspective view of a portion of a seventh embodiment of a hub with projections.

FIG. 9 illustrates an embodiment of a hub and spoke assembly 905 similar to the embodiment of FIG. 8. Again, one end 907 of a hub, not shown, is illustrated but the hub is generally of the same form as hub 106 having two ends and a center hub body. A second end would be similar to end 907. Projections 904 are joined to the end 907, preferably on opposite sides as shown. Each projection 904 includes a base portion 908, a support 910 and free end 918. Like the embodiment of FIG. 8, an outer perimeter edge 911 is discontinuous about the rotational axis wherein a radial slot 913 is disposed between adjacent free ends 818. However, this embodiment does not include an undercut slot as in the embodiment of FIG. 8.

Figure 10:
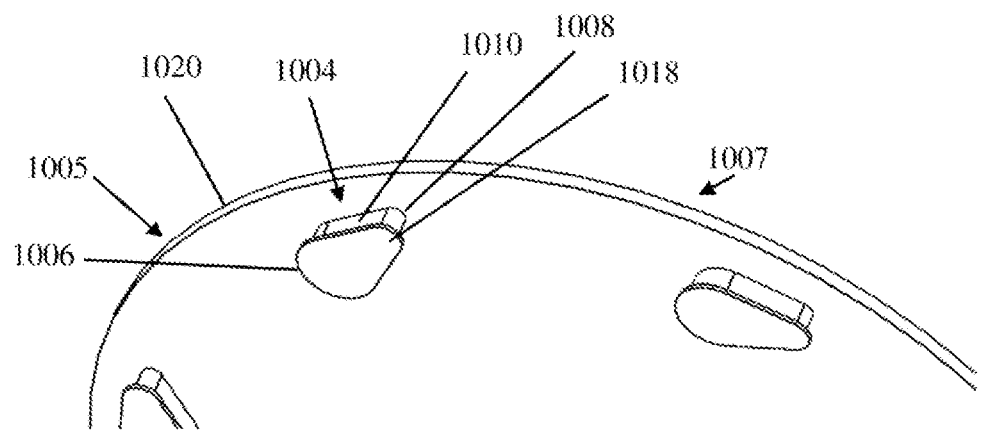
FIG. 10 is a perspective view of a portion of an eighth embodiment of a hub with projections.

FIG. 10 illustrates an embodiment of a hub and spoke assembly 1005 having functional features similar to the embodiment of FIG. 7. One end 1007 of a hub is illustrated. The other end of the hub, which has the same form as hub 106 having two ends and a center hub body is not shown. The other end would be similar to end 1007. Projections 1004 are joined to the end 1007, preferably on opposite sides although the projections on the opposite side are not shown. Each projection 1004 includes a base portion 1008, a support 1010 and free end 1018. An outer perimeter edge 1020 is continuous about the rotational axis.

Figure 11:
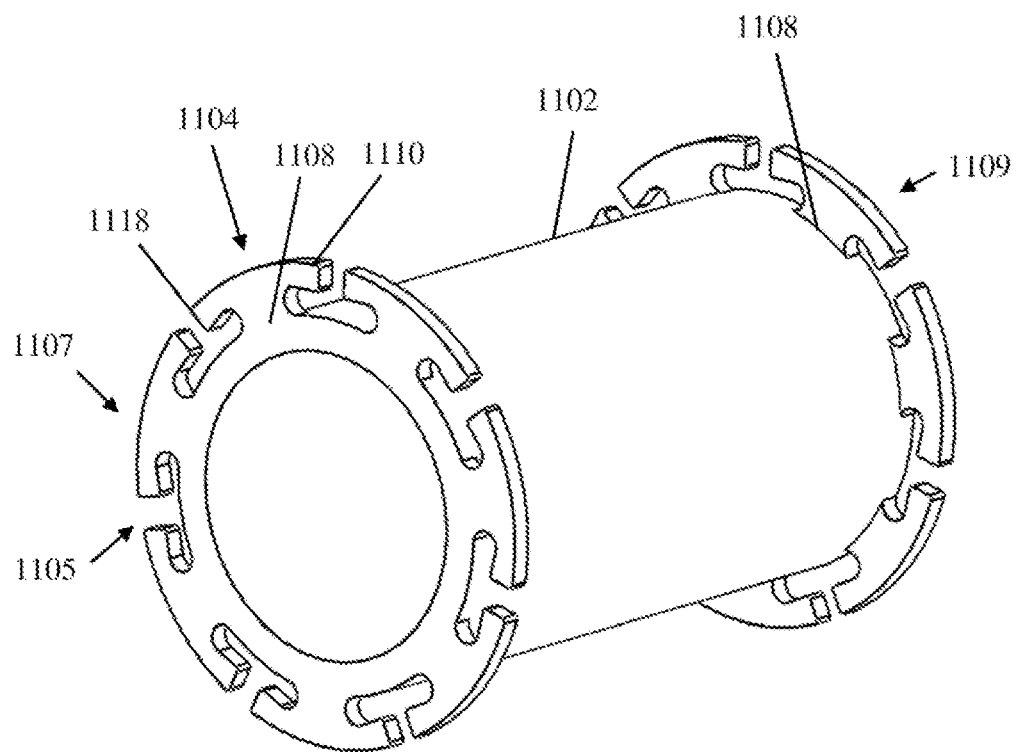
FIG. 11 is a perspective view of a ninth embodiment of a hub with projections.

FIG. 11 illustrates a hub and spoke assembly 1105 having ends 1107,1109 of a hub body 1102. Each projection 1104 includes a base portion 1108, a support 1110 and free end 1118. Projections 1104 are similar to projections 204 of FIGS. 2-4 but base portions 1108 clearly are joined to and extend from the hub body 1102 without any form of end flange.

Figure 12:
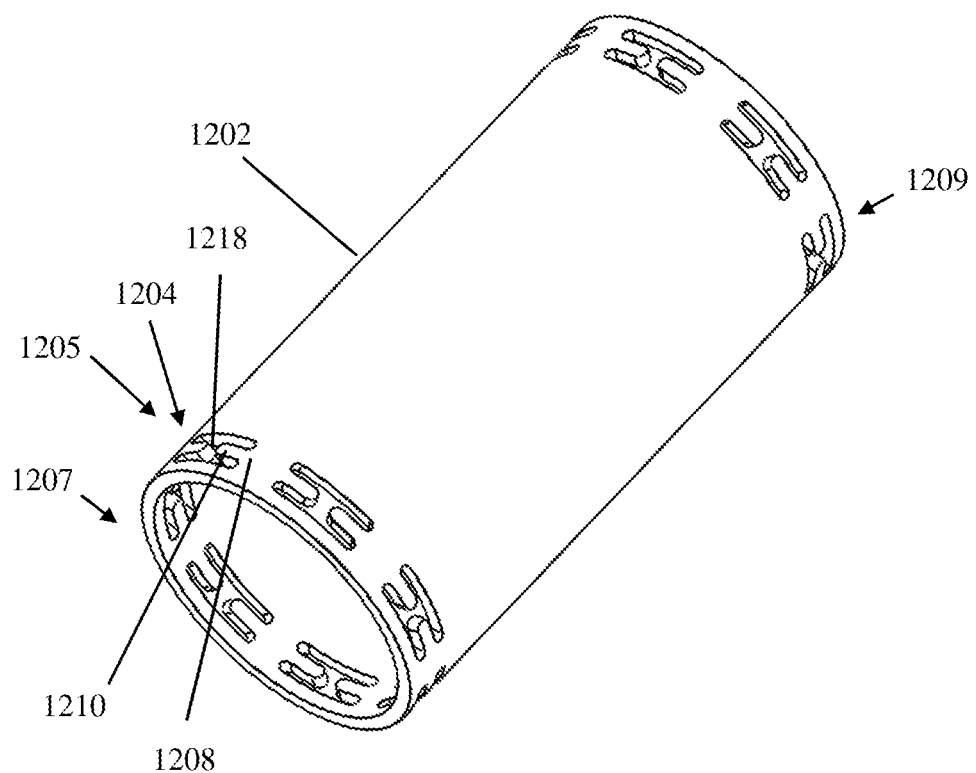
FIG. 12 is a perspective view of a tenth embodiment of a hub with projections.

FIG. 12 illustrates a hub and spoke assembly 1205 having ends 1207,1209 of a hub body 1202. Each projection 1204 includes a base portion 1208, a support 1210 and free end 1218. Projections 1204 are similar to projections 504 of FIG. 5 but the projections 1204 are formed on the hub body 1202, disposed longitudinally inwardly from perimeter edges 1206 of ends 1207, 1209, rather than being formed on an end flange body. This embodiment may be preferred not only because of its aesthetic simplicity but also because it is more aerodynamic, lighter in weight, and/or easier to manufacture. The projections 1204 might be separate bodies or formed integral with the hub body 1202 from a single unitary body. Advantages of a single unitary body can be strength, durability, and resistance to corrosion.

The following paragraphs highlight some common features found between the embodiments described above. Referring to FIGS. 2-4, the free end 218 of each support 210 of each projection 204 of extends from the base portion 208 to the free end 218 in a direction about the rotational axis of the hub. With the supports 210 extending in a direction about the rotational axis of the hub, this may reduce the risk of the spokes coming loose because the loop must travel backwards to become dislodged. This embodiment may also be preferred because of favorable aerodynamics or manufacturability compared to other embodiments. The embodiments of FIGS. 5, 8, 11, and 12 have similar projections to that shown in FIGS. 2-4, i.e., where the free end of each support of each projection extends from the base portion to the free end in a direction about the rotation axis.

Referring again back to FIGS. 2-4, two supports 210 are present in each of the projections 204,206. However, it should be noted that the supports 210 of each projection 204 extend in opposite directions about the rotational axis. One advantage of this design is that is allows two spokes to be attached to one projection, or hook, in a manner that is symmetric, and ideally with a low stress on the base portion of the projections. In addition, adjacent supports 210 extend in opposite directions about the rotational axis allowing for potentially many connection points radially distributed around the hub. These features are also apparent in the embodiments illustrated in FIGS. 5, 8, 11, and 12.

It should also be noted the supports in each of the embodiments of FIGS. 2-4, 8, and 11 are curved so that portions of the support from the base portion to the free end are at a fixed radial distance from the rotational axis. Such a design may reduce the cost to manufacture. Another advantage of curved supports is to reduce the likelihood of a spoke detaching from a projection or a support unintentionally. Alternatively, the supports could be shaped so that portions of the support from the base portion to the free end are at different radial distances from the rotational axis. This is illustrated in FIG. 4 where support 210' extends upwardly such that a free end 218' is further radially from the rotational axis than the end of the support nearest the base portion 208. With the supports 210' shaped in this manner, it may be easier to attach the loops.

The projections on which spokes are attached may extend radially away from the hub surface with respect to the rotation axis. Examples of those type of projections are depicted in FIGS. 2-4, 8, and 11. Those projections which extend radially in FIGS. 2-4, 8, and 11 may be formed from a single unitary body. One advantage of forming the projections from a single body versus multiple bodies is to reduce the cost to manufacture. For example, a hub might be machined from a single piece of aluminum or an aluminum alloy.

Alternatively, and specifically referring to FIG. 5, the projections 504 on which spokes attach to may be embodied within a flange 507 that extends radially from the associated hub body.

Hubs with flanges can be advantageous because they provide a larger diameter for transmitting torque to the rim, thereby reducing the tensile stress on spokes when a hub is subject to torque.

FIGS. 6, 7, 9, and 10 illustrate embodiments in which the projections are joined to or formed from a flange body that extends radially from the associated hub body. Projections located on the flanges are the attachment locations for one or more spokes. Referring to FIG. 6, projections 604 in this embodiment extend approximately straight away from the flange 607. In another embodiment illustrated in FIG. 7, the projections 704 extend in an "L" shape away from the flange 707. In yet another embodiment of projections, supports 1010 extending from a flange 1007 are teardrop or egg shape and have an end portion cap 1006 that helps ensure that the loops of the spokes are disposed and retained on the supports 1010.

The projections illustrated by FIGS. 6, 7, 9, and 10 might be integral with the flange body being formed from a single unitary body, to increase the strength or the manufacturability of the assembly. Different from that embodiment illustrated in FIG. 9, those of FIGS. 6, 7, and 10 have an outer perimeter edge that is continuous about the rotational axis at a radial distance from the rotational axis greater than each of the associated base portions. In addition, the projections within these three embodiments extend in a direction parallel to the rotation axis and adjacent supports on either side of each flange extend in opposite longitudinal directions. This has the advantage of providing an attachment point for two separate spokes on either side of the flange.

Alternatively, FIG. 11 depicts a hub body 1102 without a distinct flange. Instead, the projections 1104 attach directly to the hub body 1102. Advantages of this type of design can be lower weight, smaller hub diameter, or ease of manufacturing.

Figure 13:
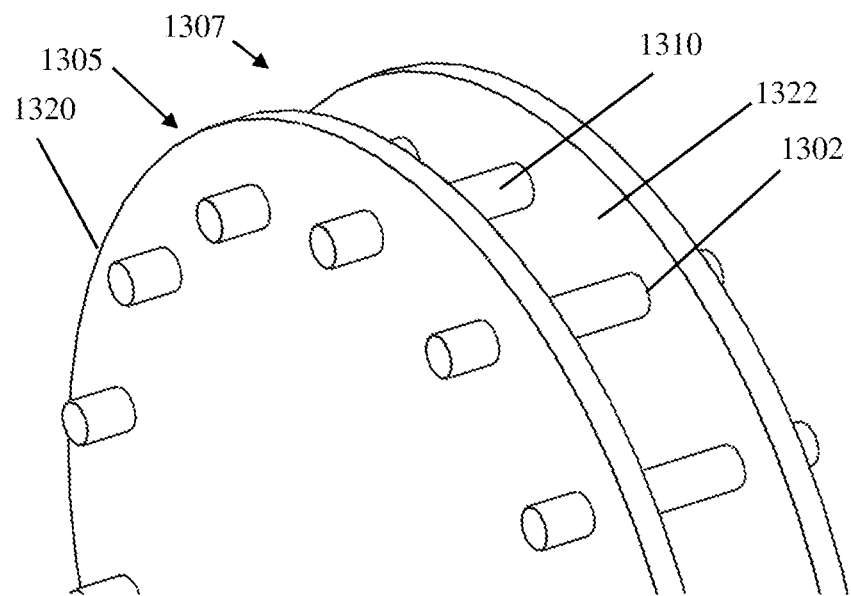
FIG. 13 is a perspective view of a portion of an eleventh embodiment of a hub with projections.

Yet a different hub design of a hub and spoke assembly 1305 to retain braided fiber spokes with loops is illustrated in FIG. 13. One end 1307 of the hub is illustrated; however, like the other embodiments described above, a second end would be provided on the opposite end of the hub, where the hub body would be similar to hub body 102 or 1102. On each end, a pair of spaced-apart flanges 1322 is provided. An outer perimeter edge 1320 is continuous about the rotational axis. Each flange 1322, includes apertures 1302 where the apertures 1302 are located in the flanges 1310 such as to receive removable supports 1320 that extend between each pair of flanges 1322. Preferably, the supports 1310 extend in a direction parallel to the axis of rotation; however, the supports 1310 could in a different direction that is not parallel to the rotational axis as long as the supports still adequately attach the spokes to the hub. One benefit of this embodiment compared to the other embodiments of FIGS. 2-12 is that the braided fiber spoke loop is retained by support 1310 between the two flanges 1322 and support 1310 is supported on both ends (i.e. comprising no free end). In this embodiment, it is not possible to remove the loop intact without disassembling the supports 1310 from the flanges 1322. This could be advantageous for safety or reliability of the hub and spoke system. One, preferably two, or even more than two spokes might be joined to each support 1310. Joining more than one spokes to each support 1310 has the advantage of reducing the complexity of the hub.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A hub and spoke assembly comprising:
   a hub body being symmetric about a rotational axis having a first end and a second end;
   a first plurality of projections disposed on the hub body at the first end and a second plurality of projections disposed on the hub body at the second end, wherein projections of each of the first plurality of projections and the second plurality of projections are spaced apart from each adjacent projection about the rotational axis on the first and second ends, respectively, and wherein each projection of the first plurality of projections and the second plurality of projections comprises a base portion joined to the hub body and a support extending from the base portion to a free end, wherein each support of each projections of the first plurality of projections and the second plurality of projections extends from the base portion to the free end in a rotational direction about the rotational axis, and wherein adjacent supports of adjacent projections in each of the first plurality of projections and the second plurality of projections extend in opposite rotational directions about the rotational axis; and a first plurality of spokes and a second plurality of spokes, each spoke of the first plurality of spokes and the second plurality of spokes comprises an elongated braided fiber having a loop at a first end and a second end configured for attachment to a rim, wherein at least one spoke of the first plurality of spokes is joined to each support of the first plurality of projections with the loop disposed about the support, and wherein at least one spoke of the second plurality of spokes is joined to each support of the second plurality of projections with the loop disposed about the support.

2. The hub and spoke assembly of claim 1 wherein each base portion of each projection of the first plurality of projections and the second plurality of projections extends radially away from a surface of the hub body with respect to the rotational axis.

3. The hub and spoke assembly of claim 2 wherein each base portion and associated support of each projection of the first plurality of projections and the second plurality of projections are integral with the hub body being formed from a single unitary body.

4. The hub and spoke assembly of claim 1 wherein each support of each projection of the first plurality of projections and the second plurality of projections is curved so that portions of the support from the base portion to the free end are at a fixed radial distance from the rotational axis.

5. The hub and spoke assembly of claim 1 wherein each support of each projection of the first plurality of projections and the second plurality of projections is shaped so that portions of the support from the base portion to the free end are at different radial distances from the rotational axis.

6. The hub and spoke assembly of claim 1 wherein each base portion and associated support of each projection of the first plurality of projections and the second plurality of projections are disposed longitudinally inwardly from a perimeter edge of the first end and a perimeter edge of the second end, respectively.

7. The hub and spoke assembly of claim 6 wherein each base portion and associated support of each projection of the first plurality of projections and the second plurality of projections are integral with the hub body being formed from a single unitary body.

8. The hub and spoke assembly of claim 1 wherein each of the first end and second end comprise a flange with a flange body extending radially away from the hub body to an outer perimeter edge, and wherein the first plurality of projections is located on the flange of the first end and the second plurality of projections is located on the flange of the second end.

9. The hub and spoke assembly of claim 8 wherein each base portion and associated support of each projection of the first plurality of projections and the second plurality of projections are integral with the flange body being formed from a single unitary body.

10. The hub and spoke assembly of claim 9 wherein the outer perimeter edge of each of the first end and the second end is continuous about the rotational axis at a radial distance from the rotational axis greater than each of the associated base portions.

11. The hub and spoke assembly of claim 8 wherein each support of each projection extends away from the associated flange body in a direction parallel to the rotational axis.

12. The hub and spoke assembly of claim 11 wherein adjacent supports of adjacent projections in each of the first plurality of projections and the second plurality of projections extend in opposite longitudinal directions with respect to the rotational axis.

13. The hub and spoke assembly of claim 11 wherein each support of each projection is egg or tear-drop shaped.

14. The hub and spoke assembly of claim 8 wherein the outer perimeter edge of each of the first end and the second end is discontinuous about the rotational axis wherein a radial slot is disposed between adjacent projections about the rotational axis in the flange body on each of the first and second ends.

15. The hub and spoke assembly of claim 1 wherein some adjacent supports of the first and second plurality of projections have free ends thereof spaced apart from each other to create an associated space therebetween configured to allow a portion of spokes of the first plurality of spokes and the second plurality of spokes to extend through for locating one spoke on each support.

16. A hub assembly comprising:
a hub body being symmetric about a rotational axis having a first end and a second end, the first end having a first pair of longitudinally spaced apart flanges and the second end having a second pair of longitudinally spaced apart flanges having a flange body extending radially away from the hub body to an outer perimeter edge encircling the rotational axis, wherein each flange body includes apertures, and wherein the apertures of each flange body are disposed about the rotational axis such that for each of the first pair longitudinally spaced apart flanges and the second pair of longitudinally spaced apart flanges, pairs of aligned aperture are provided wherein each aperture on one of the flange bodies is aligned with an aperture on the other flange body; and
a plurality of supports for the first and second ends, wherein a support of the plurality of supports is removably mounted in each pair of aligned apertures.

17. The hub assembly of claim 16 wherein each support mounted in each pair of aligned apertures extends in a direction parallel to the rotational axis.

18. The hub assembly of claim 17 and further comprising a plurality of spokes, each spoke comprising an elongated braided fiber having a loop at a first end and a second end configured for attachment to a rim, wherein at least one spoke is joined to each support and the loop is disposed about the support and the support mounted in the associated apertures.

19. The hub of claim 17 wherein two spokes are joined to each support.

20. A hub comprising:
a hub body being symmetric about a rotational axis having a first end and a second end; and
a first plurality of projections disposed on the hub body at the first end and a second plurality of projections disposed on the hub body at the second end, wherein projections of each of the first plurality of projections and the second plurality of projections are spaced apart from each adjacent projection about the rotational axis on the first and second ends, respectively, wherein each projection of the first plurality of projections and the second plurality of projections comprises a base portion joined to the hub body and a support extending from the base portion to a free end, and wherein each support of each projection of the first plurality of projections and the second plurality of projections extends from the base portion to the free end in a rotational direction about the rotational axis, and wherein some adjacent supports of the first and second plurality of projections have free ends thereof spaced apart from each other to create an associated space therebetween configured to allow a portion of spokes to extend through for locating once of the spokes on each support.

21. The hub of claim 20 wherein each base portion of each projection of the first plurality of projections and the second plurality of projections extends radially away from a surface of the hub body with respect to the rotational axis.

22. The hub of claim 20 wherein the free ends of said some adjacent supports of the first and second plurality of projections face toward each other with the associated space formed between the free ends.

23. The hub of claim 20 wherein each support of each projection of the first plurality of projections and the second plurality of projections is curved so that portions of the support from the base portion to the free end are at a fixed radial distance from the rotational axis.

24. The hub of claim 20 wherein each support of each projection of the first plurality of projections and the second plurality of projections is shaped so that portions of the support from the base portion to the free end are at different radial distances from the rotational axis.

* * * * *